(12) United States Patent
Huang

(10) Patent No.: US 8,777,419 B2
(45) Date of Patent: Jul. 15, 2014

(54) PROJECTION APPARATUS AND LOCATION METHOD FOR DETERMINING A POSITION OF A LIGHT POINT ON A PROJECTION IMAGE

(75) Inventor: June-jei Huang, Taoyuan Hsien (TW)

(73) Assignee: Delta Electronics, Inc., Taoyuan Hsien ( * ) Notice: Subject to any disclaimer, the term of this patent is extended or adjusted under 35 U.S.C. 154(b) by 686 days.

(21) Appl. No.: 13/045,721

(22) Filed: Mar. 11, 2011

(65) Prior Publication Data

US 2011/0241990 A1    Oct. 6, 2011

(30) Foreign Application Priority Data

Apr. 1, 2010 (TW) ................................ 99110123 A

(51) Int. Cl.
*G03B 21/14* (2006.01)

(52) U.S. Cl.
USPC .............. 353/69; 353/30; 353/38; 353/42; 353/46; 353/85; 349/7; 349/62; 349/65; 348/744; 348/747

(58) Field of Classification Search
USPC ........... 353/30, 31, 33, 37, 38, 42, 46, 69–70, 353/81, 84, 85; 348/744–747, E5.137, 348/E5.142, E5.143, E5.144, E9.012; 349/5, 7–9, 62, 65
See application file for complete search history.

(56) References Cited

U.S. PATENT DOCUMENTS

| | | | |
|---|---|---|---|
| 6,260,973 B1 * | 7/2001 | Minato et al. .................... | 353/42 |
| 6,839,095 B2 * | 1/2005 | Bierhuizen et al. ............... | 349/9 |
| 7,378,631 B2 * | 5/2008 | Hong ............................ | 250/205 |
| 7,503,658 B2 * | 3/2009 | Hu et al. ........................ | 353/84 |
| 8,047,660 B2 * | 11/2011 | Penn et al. ..................... | 353/102 |
| 8,123,361 B2 * | 2/2012 | Nagashima et al. ............ | 353/30 |
| 2003/0210229 A1 * | 11/2003 | Nishimura et al. ........... | 345/157 |
| 2005/0057729 A1 | 3/2005 | Huang | |
| 2005/0078279 A1 | 4/2005 | Tamura | |
| 2005/0122721 A1 | 6/2005 | Hori | |
| 2006/0065735 A1 | 3/2006 | Li et al. | |
| 2009/0174824 A1 * | 7/2009 | Shirai et al. ................... | 348/760 |
| 2009/0251056 A1 * | 10/2009 | Cho ............................. | 315/149 |
| 2010/0013801 A1 | 1/2010 | Kondo et al. | |

FOREIGN PATENT DOCUMENTS

| | | |
|---|---|---|
| CN | 2664064 | 12/2004 |
| CN | 1605927 | 4/2005 |

(Continued)

OTHER PUBLICATIONS

Office Action from corresponding Chinese Appln. No. 201010161332.X dated Oct. 10, 2012. English translation attached.

(Continued)

*Primary Examiner* — Sultan Chowdhury
(74) *Attorney, Agent, or Firm* — Grossman, Tucker, Perreault & Pfleger, PLLC

(57) ABSTRACT

A projection apparatus and a location method for determining a position of a light point on a projection image of the projection apparatus are provided. The projection apparatus comprises a lens, a light detector, a light guide module and a processing circuit. The light guide module is configured to receive the light point via the lens, and to guide the light point into the light detector. The light detector outputs a detection signal to the processing circuit according to the light point within a detection period. The processing circuit determines the position of the light point on the projection image according to the detection signal.

23 Claims, 9 Drawing Sheets

(56) References Cited

FOREIGN PATENT DOCUMENTS

| CN | 101627354 | 1/2010 |
|----|-----------|--------|
| JP | 2005-173019 | 6/2005 |
| TW | 200512528 | 4/2005 |
| TW | 200623838 | 7/2006 |

OTHER PUBLICATIONS

Office Action from corresponding Taiwanese Appln. No. 099110123 dated Dec. 23, 2013. English translation attached.

* cited by examiner

| 10000 | 10001 | 10010 | 10011 |
|---|---|---|---|
| 10100 | 10101 | 10110 | 10111 |
| 11000 | 11001 | 11010 | 11011 |
| 11100 | 11101 | 11110 | 11111 |

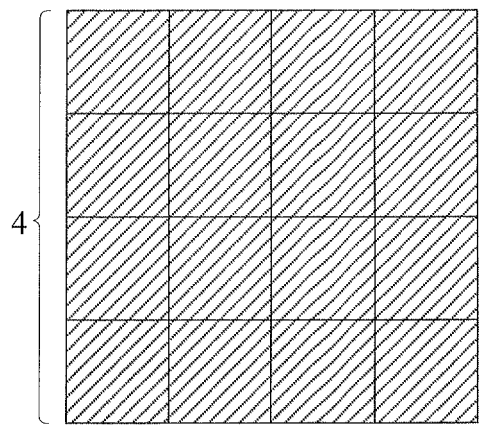
FIG. 4A
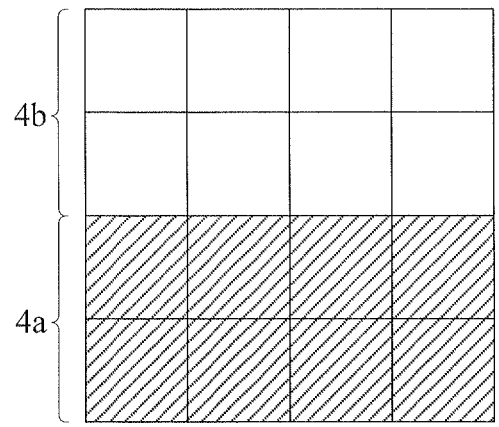
FIG. 4B
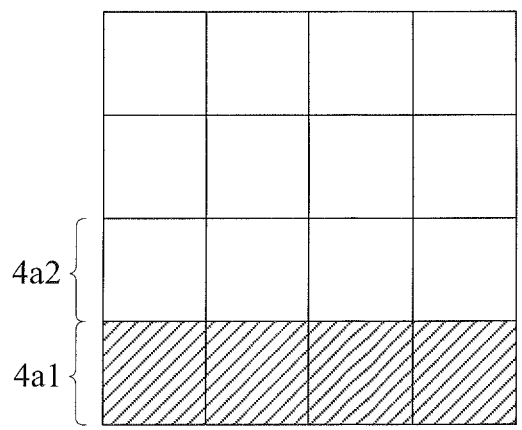
FIG. 4C
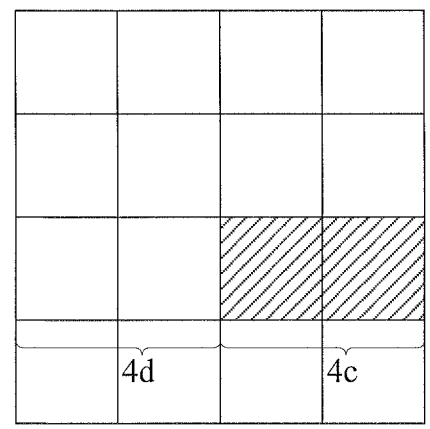
FIG. 4D
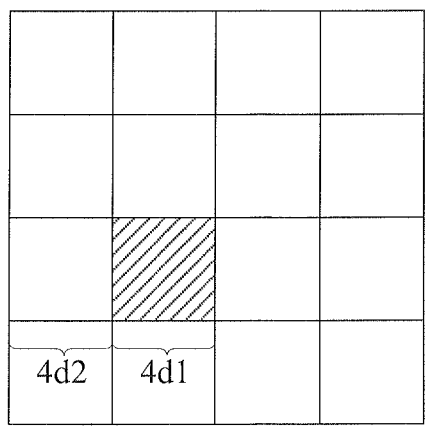
FIG. 4E
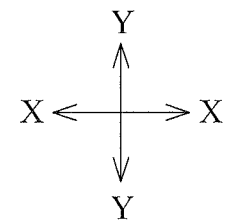

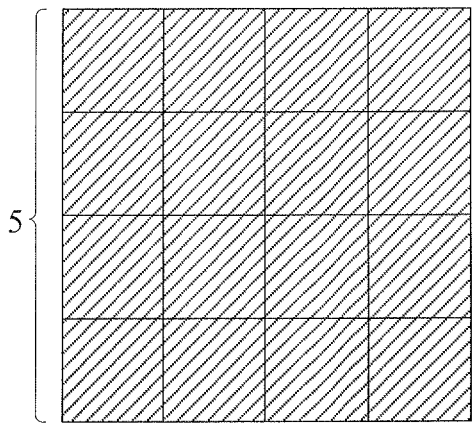
FIG. 5A
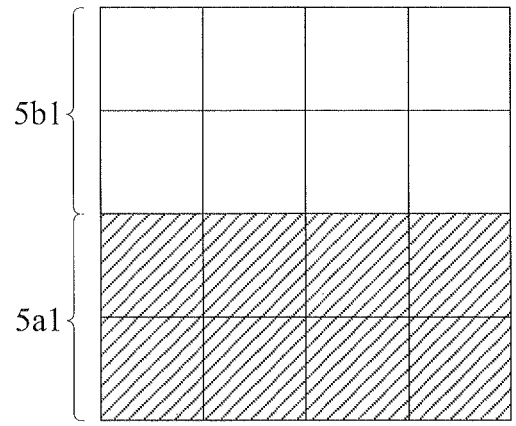
FIG. 5B
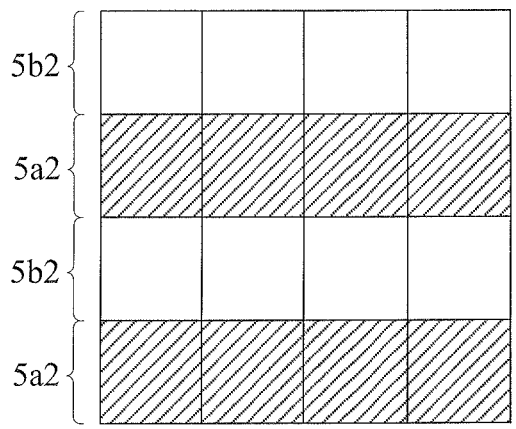
FIG. 5C
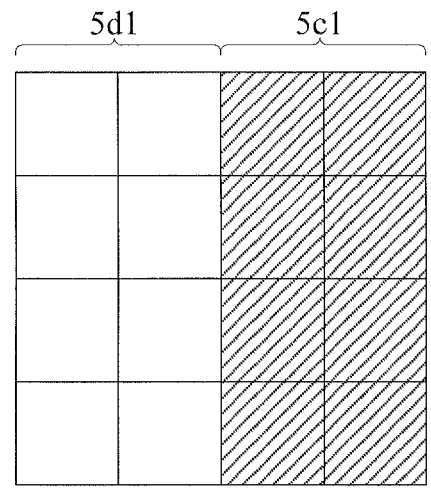
FIG. 5D
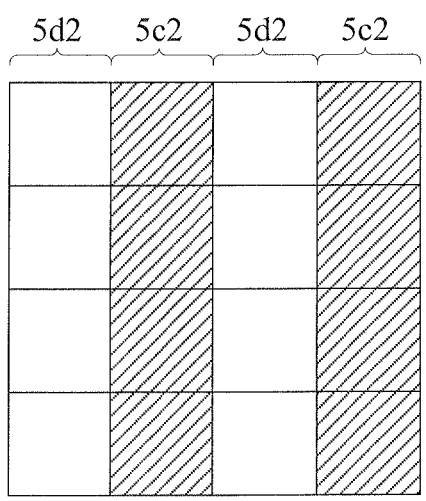
FIG. 5E
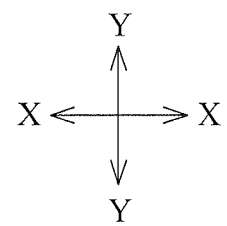

PROJECTION APPARATUS AND LOCATION METHOD FOR DETERMINING A POSITION OF A LIGHT POINT ON A PROJECTION IMAGE

This application claims the benefit of priority based on Taiwan Patent Application No. 099110123 filed on Apr. 1, 2010, which is hereby incorporated by reference in its entirety.

CROSS-REFERENCES TO RELATED APPLICATIONS

Not applicable.

BACKGROUND OF THE INVENTION

1. Field of the Invention

The present invention relates to a projection apparatus and a location method for the projection apparatus. More particularly, the present invention relates to a projection apparatus for determining a position of a light point on a projection image and a location method thereof.

2. Descriptions of the Related Art

In recent years, owing to gradual improvement of imaging quality, decrease in production cost and miniaturization in volume of projection apparatuses, use of the projection apparatuses no matter in enterprises, by individuals or at homes has experienced a steady increase. For example, when using a computer to make a presentation in enterprises or in academic circles, a user usually connects the computer to a projection apparatus to project an image on a projection screen.

Furthermore, when making the presentation, the user usually uses a laser pointer so that, by means of a light point outputted by the laser pointer, contents of the current presentation can be indicated in the image projected by the projection apparatus. Accordingly, to improve the value in use of the projection apparatus, the conventional projection apparatus with interaction functionality utilizes a charge-coupled device (CCD) to receive the light point outputted by the laser pointer and then determine a position of the light point on the image projected by the projection apparatus to generate a determination result. Finally, the projection apparatus outputs the position of the light point outputted by the laser pointer to the computer connected with the projection apparatus. In this way, the user will be able to operate the computer via the laser pointer.

However, as a kind of two-dimensional position sensor, the CCD must be used in conjunction with an additional lens in order to receive the light point outputted by the laser pointer. Therefore, when manufacturers produce such projection apparatuses with interaction functionality, in addition to the original lens for projecting an image, an additional lens for receiving the light point outputted by the laser pointer must be further used, which considerably increases the volume of the projection apparatus. Consequently, this makes it impossible for the projection apparatus manufacturers to produce projection apparatuses with interaction functionality on basis of miniaturized projection apparatuses of a rear projection type or a front projection type.

Accordingly, an urgent need exists in the art to provide a solution that can produce a miniaturized projection apparatus with interaction functionality to overcome the limitations in design of projection apparatuses with interaction functionality caused by the CCD.

SUMMARY OF THE INVENTION

An objective of the present invention is to provide a projection apparatus for determining a position of a light point on a projection image. The projection apparatus comprises a lens, a light detector, a light guide module and a processing circuit. The processing circuit is electrically connected to the light detector. The light guide module comprises a plurality of mirrors that form an array having $2^n \times 2^m$ pixels. The light guide module is adapted to receive the light point via the lens and guide the light point to the light detector. The light detector is adapted to receive the light point from the light guide module and output a detection signal to the processing circuit according to the light point within a detection period. Then, the processing circuit determines the position of the light point on the projection image according to the detection signal.

Another objective of the present invention is to provide a location method for determining a position of a light point on a projection image, which is adapted for the projection apparatus described above. The location method comprises the following steps of: (a) generating a detection period; (b) stopping the projection light being projected within the detection period; (c) receiving the light point via the lens and transmitting the light point to the light guide module; (d) after receiving the light point, forwarding the light point to the light detector; (e) outputting a detection signal to the processing circuit according to the light point; and (f) determining the position of the light point on the projection image according to the detection signal.

A further objective of the present invention is to provide a location method for determining a position of a light point on a projection image within a detection period, which is adapted for the projection apparatus described above. The location method comprises the following steps of: (a) stopping the projection light being projected within the detection period; (b) turning on the mirrors; (c) dividing the array into at least one first area and at least one second area according to a first direction; (d) turning on the mirrors of the at least one first area; (e) turning off the mirrors of the at least one second area; (f) dividing the array into at least one third area and at least one fourth area according to a second direction, wherein the first direction is orthogonal to the second direction; (g) turning on the mirrors of the at least one third area; (h) turning off the mirrors of the at least one fourth area; and (i) determining the position of the light point on the projection image according to two of the at least one first area, the at least one second area, the at least one third area and the at least one fourth area.

Yet a further objective of the present invention is to provide another location method for determining a position of a light point on a projection image within a detection period, which is adapted for the projection apparatus described above. The location method comprises the following steps of: (a) stopping the projection light being projected within the detection period; (b) turning on the mirrors; (c) dividing the array into at least one first area and at least one second area according to a first direction; (d) turning on the mirrors of the at least one first area; (e) turning off the mirrors of the at least one second area; (f) determining a position of the light point in the first direction according to one of the at least one first area and the at least one second area; (g) dividing one of the at least one first area and the at least one second area into at least one third area and at least one fourth area according to the position of the light point in the first direction and according to a second direction, wherein the first direction is orthogonal to the second direction; (h) turning on the mirrors of the at least one third area; (i) turning off the mirrors of the at least one fourth area; (j) determining a position of the light point in the second direction according to one of the at least one third area and the at least one fourth area; and (k) determining the position of the light point on the projection image according to the position of the light point in the first direction and the position of the light point in the second direction.

Still a further objective of the present invention is to provide a further location method for determining a position of a light point on a projection image within a detection period, which is adapted for the projection apparatus described above. The location method comprises the following steps of: (a) stopping the projection light being projected within the detection period; (b) transmitting a plurality of turn-on/off signals within the detection period; (c) performing a turn-on/off operation by each of the mirrors according to a timing sequence in response to the turn-on/off signals; (d) enabling the light detector to generate and transmit a plurality of pulse signals according to the turn-on/off operation of each of the mirrors; and (e) determining the position of the light point on the projection image according to the pulse signals.

According to the above descriptions, the projection apparatus and the method for determining a position of a light point on a projection image of the projection apparatus according to the present invention can form the projection image and determine the position of the light point on the projection image through a light guide module. In detail, the present invention forms the projection image through a plurality of minor elements of the light guide module directly, and determines the position of the light point on the projection image by using the mirror elements. Compared to the conventional projection apparatus with interaction functionality, the projection apparatus of the present invention can eliminate use of the charge-coupled device (CCD) and, instead, utilize elements requisite for the projection apparatus per se to determine the position of the light point on the projection image directly. Thus, the projection apparatus of the present invention not only has the advantage of a miniaturized design, but can also save cost of the CCD so as to further reduce the production cost.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIGS. 3A to 3B, FIGS. 4A to 4E and FIGS. 5A to 5E are schematic views of examples of the first embodiment and the second embodiment;

DESCRIPTION OF THE PREFERRED EMBODIMENT

In the following description, the present invention will be explained with reference to embodiments thereof. The present invention relates to a projection apparatus for determining a position of a light point on a projection image and a location method thereof. The projection apparatus may be an apparatus with projection display functionality such as a digital light processing (DLP) projection display or a liquid crystal display (LCD) projection display. It shall be appreciated that, description of these embodiments is only for purpose of illustration rather than to limit the present invention. Meanwhile, in the following embodiments and the attached drawings, elements unrelated to the present invention are omitted from depiction; and dimensional relationships among individual elements in the attached drawings are illustrated only for ease of understanding, but not to limit the actual scale.

Figure 1:
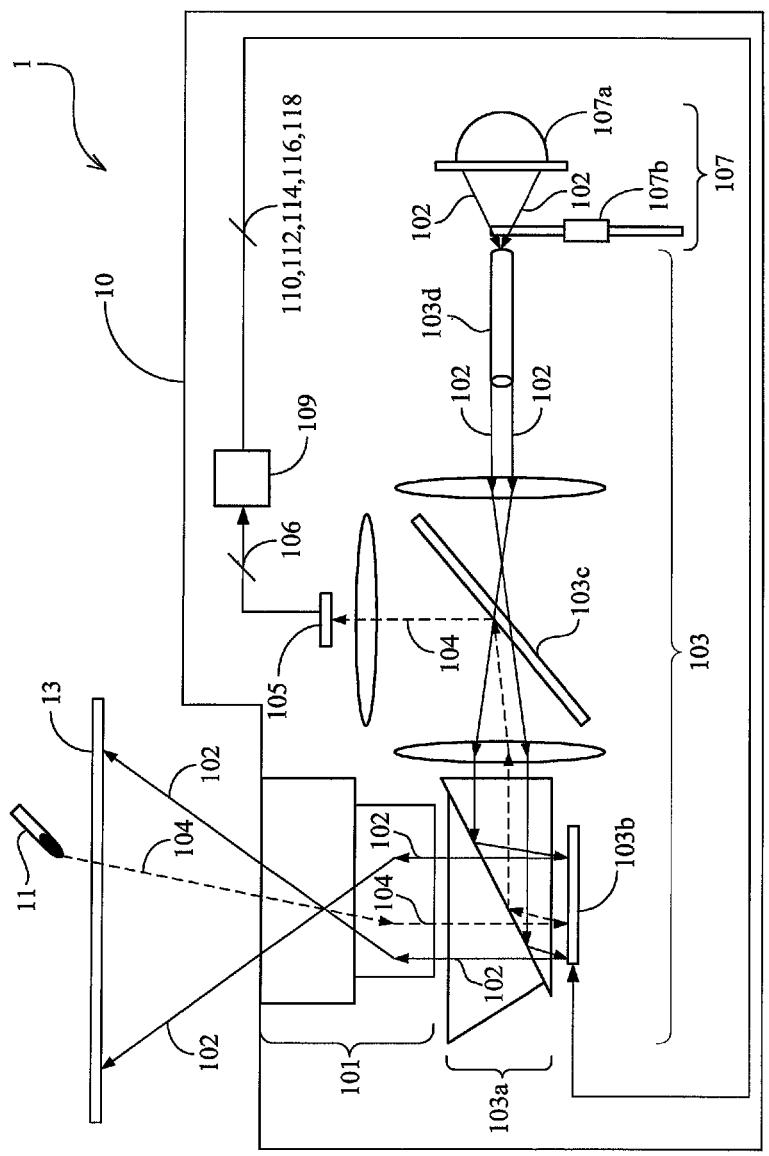
FIG. 1 is a schematic view of a projection system of a first embodiment of the present invention.

FIG. 1 shows a first embodiment of the present invention, which is a projection system 1 comprising a projection apparatus 10, a laser pointer 11 and a projection screen 13. The projection apparatus 10 may be a projection display of a rear projection type or a front projection type. The projection apparatus 10 comprises a lens 101, a light guide module 103, a light detector 105, a light source module 107 and a processing circuit 109. The light source module 107 comprises a light bulb 107a and a color wheel 107b. The light guide module 103 comprises a TIR-prism 103a, a digital micromirror device (DMD) 103b, a beam splitter 103c and a light integration rod 103d.

The light bulb 107a is adapted to generate and output projection lights 102 (shown as solid lines in FIG. 1). The color wheel 107b has a red section, a blue section, a green section and a black section, which are adapted to change a wavelength of the projection lights 102 respectively and are switched in sequence through rotation of the color wheel 107b at a fixed time period. When the projection lights 102 pass through the red section, the blue section and the green section of the color wheel 107b, the light source module 107 will output the projection lights 102 of different wavelengths respectively, which is known as a turn-on period of the projection apparatus 10. When the projection lights 102 are blocked by the black section of the color wheel 107b, the light source module 107 will not output any projection lights 102, which is known as a detection period of the projection apparatus 10. Accordingly, through the color wheel 107b that switches between the red section, the blue section, the green section and black section in sequence, the projection apparatus 10 will switch between the turn-on period and the detection period periodically.

Within the turn-on period of the projection apparatus 10, the lens 101 receives the projection lights 102 via the light guide module 103 and displays a projection image on the projection screen 13. By use of the laser pointer 11, a light point of an infrared ray (IR ray) 104 (shown as dotted lines in FIG. 1) can be formed on the projection image displayed by the projection screen 13. Within the turn-off period of the projection apparatus 10, the light guide module 103 will receive the IR ray 104 via the lens 101 and guide the IR ray 104 to the light detector 105.

Subsequently, after receiving the IR ray 104 from the light guide module 103, the light detector 105 will output a detection signal 106 to the processing circuit 109 according to the IR ray 104. It shall be particularly noted that, the detection signal 106 consists of a plurality of pulse signals. Finally, according to the detection signal 106, the processing circuit 109 determines a position of the light point of the IR ray 104 on the projection image displayed by the projection screen 13.

In detail, the DMD 103b of the light guide module 103 has a plurality of mirrors (not shown), and further enables the aforesaid mirrors to perform a spatial modulation procedure within the detection period. The spatial modulation procedure is to enable the aforesaid mirrors to perform several kinds of specific spatial modulations, and will be described in detail hereinafter. The mirrors form an array of $2^n \times 2^m$ pixels, where both n and m are a positive integer. The detection signal 106 is comprised of n+m+1 bits and corresponds to one of the aforesaid $2^n \times 2^m$ pixels. The processing circuit 109 is electrically connected to the DMD 103b to control turn-on/off of the minors of the DMD 103b. Accordingly, by turning on/off the minors of the DMD 103b, the projection apparatus 10 can guide the projection lights 102 to the lens 101 and display the projection image on the projection screen 13; similarly, also by turning on/off the minors of the DMD 103b, the projection apparatus 10 guides the IR ray 104 to the light detector 105 and outputs the detection signal 106 so that, according to the detection signal 106, the processing circuit 109 determines the position of the light point of the IR ray 104 on the projection image displayed on the projection screen 13.

Figure 2:
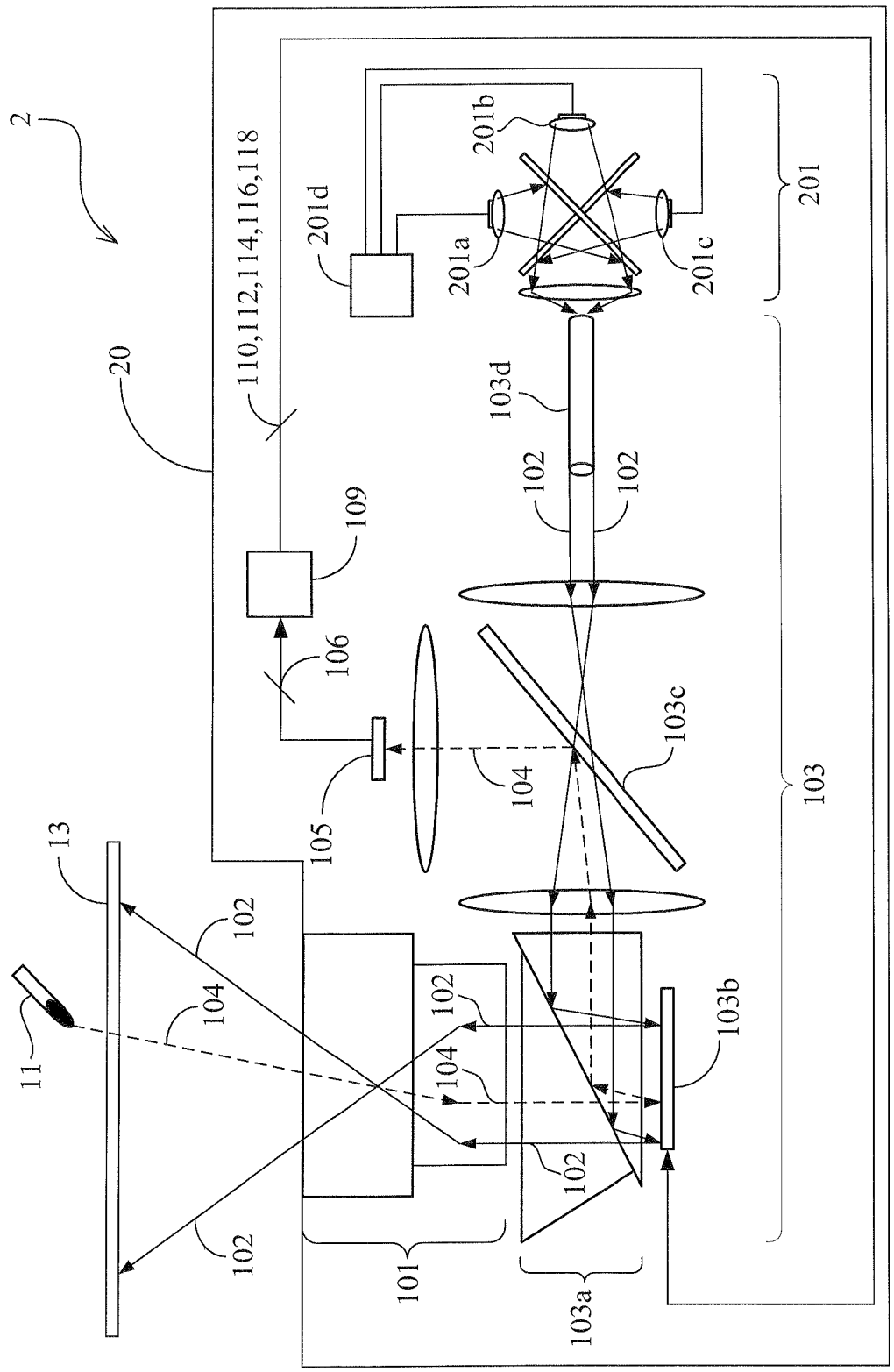
FIG. 2 is a schematic view of a projection system of a second embodiment of the present invention.

FIG. 2 shows a second embodiment of the present invention, which is another projection system 2 comprising a projection apparatus 20, a laser pointer 11 and a projection screen 13. It shall be particularly noted that, in the second embodiment, most of descriptions other than that of a light source module 201 are identical to those of the first embodiment and, thus, will not be further described herein. The projection apparatus 20 of the second embodiment may also be a projection display of a rear projection type or a front projection type, and the light source module 201 thereof comprises a plurality of light emitting diodes (LEDs) 201a, 201b, 201c and a control unit 201d.

In this embodiment, the LEDs 201a, 201b, 201c are a red LED 201a, a blue LED 201b and a green LED 201c respectively. The control unit 201d is adapted to control turn-on/off of the LEDs 201a, 201b, 201c. When the control unit 201d turns on the red LED 201a, the blue LED 201b and the green LED 201c in sequence, projection lights 102 of different wavelengths will be outputted by the light source module 201, which is known as a turn-on period of the projection apparatus 20. When the control unit 201d turns off the LEDs 201a, 201b, 201c, the light source module 201 will not output any projection lights 102, which is known as a detection period of the projection apparatus 20. Accordingly, by turning on/off the LEDs 201a, 201b, 201c in sequence, the projection apparatus 20 will switch between the turn-on period and the detection period periodically.

Here, it shall be particularly noted that, the present invention is not limited to have the light source module 201 output the projection lights 102 of different wavelengths by use of the red LED 201a, the blue LED 201b and the green LED 201c. Those of ordinary skill in the art may also have the light source module 201 output the projection lights 102 of different wavelengths by direct use of a single LED that can convert wavelengths or by use of any other light emitting elements with the same functionality, and this will not be further described herein.

In the following paragraphs, different examples where the projection apparatuses 10, 20 described in the first embodiment and the second embodiment determine the position of the light point of the IR ray 104 on the projection image displayed by the projection screen 13 will be described with reference to FIG. 3A to FIG. 3B, FIG. 4A to FIG. 4E and FIG. 5A to FIG. 5E.

Figures 3A, 3B:
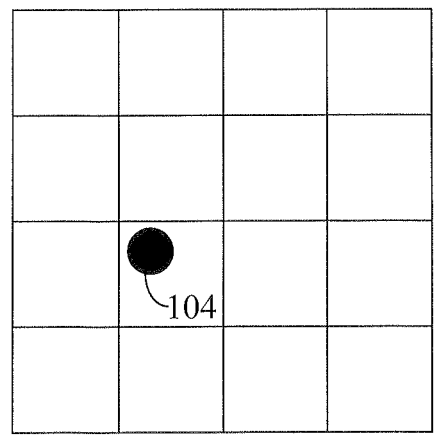

Referring to FIG. 3A, there is shown a schematic view of the DMD 103b of the light guide module 103. The DMD 103b has 16 mirrors that form an array of $2^2 \times 2^2$ pixels. The light point of the IR ray 104 will be projected to one of the mirrors of the DMD 103b within the detection period of the projection apparatuses 10, 20. FIG. 3B depicts the detection signal 106 corresponding to each of the mirrors of the DMD 103b. In the first embodiment and the second embodiment, the DMD 103b is an array of $2^2 \times 2^2$ pixels formed by the 16 minors, so the detection signal 106 is formed by 5 pulse signals and, therefore, comprises 5 bits.

It shall be particularly noted that, the present invention is not limited to that the DMD 103b must be an array of $2^2 \times 2^2$ pixels formed by 16 minors. A different amount of minors may also be arranged in the DMD 103b by those of ordinary skill in the art; for example, 256 mirrors may be arranged to form an array of $2^4 \times 2^4$ pixels to achieve the function of the DMD 103b; in this case, in the projection apparatuses 10, 20 with the DMD 103b having the array of $2^4 \times 2^4$ pixels formed by the 256 minors, the detection signal 106 will be formed by 9 pulse signals and, therefore, comprise 9 bits.

FIG. 4A to FIG. 4E depict one of examples where the DMD 103b of the projection apparatuses 10, 20 described in the first embodiment and the second embodiment performs a spatial modulation procedure within the detection period to determine the position of the light point of the IR ray 104 on the projection image displayed by the projection screen 13. As shown in FIG. 4A, in the spatial modulation procedure performed within the detection period, the processing circuit 109 outputs a first turn-on/off signal 110 to turn on all minors (represented by oblique lines) of an array 4 in the DMD 103b; then, the light detector 105 will detect the light point of the IR ray 104 through the minors of the array 4 in the DMD 103b and output a first pulse signal at a high level to the processing circuit 109. Accordingly, the processing circuit 109 will determine that the light point of the IR ray 104 is located in the array 4.

Subsequently, as shown in FIG. 4B, the processing circuit 109 divides the array 4 into a first area 4a and a second area 4b according to a first direction (i.e., the X direction). Then, the processing circuit 109 will output a second turn-on/off signal 112 to turn on the minors (represented by of oblique lines) of the first area 4a and turn off the mirrors (represented by blank portions) of the second area 4b in the DMD 103b. At this time, the light detector 105 will detect the light point of the IR ray 104 through the minors of the first area 4a in the DMD 103b and output a second pulse signal at a high level to the processing circuit 109. Accordingly, the processing circuit 109 will determine that the light point of the IR ray 104 is located in the first area 4a.

Then, as shown in FIG. 4C, the processing circuit 109 further divides the first area 4a where the light point of the IR ray 104 is located into another first area 4a1 and another second area 4a2 according to the first direction (i.e., the X direction). Then, the processing circuit 109 outputs a third turn-on/off signal 114 to turn on the minors (represented by oblique lines) of the first area 4a1 and turn off the mirrors (represented by blank portions) of the second area 4a2 in the DMD 103b. At this time, because the light point of the IR ray 104 is located in the second area 4a2 of the DMD 103b, it is impossible for the light point of the IR ray 104 to be detected by the light detector 105 and, thus, the light detector 105 outputs a third pulse signal at a low level to the processing circuit 109. Accordingly, the processing circuit 109 will determine that the light point of the IR ray 104 is located in the second area 4a2.

Further, as shown in FIG. 4D, the processing circuit 109 divides the second area 4a2 where the light point of the IR ray 104 is located into a third area 4c and a fourth area 4d according to a second direction (i.e., the Y direction) orthogonal to the first direction. Then, the processing circuit 109 outputs a fourth turn-on/off signal 116 to turn on the minors (represented by oblique lines) of the third area 4c and turn off the mirrors (represented by blank portions) of the fourth area 4d in the DMD 103b. At this time, because the light point of the IR ray 104 is located in the fourth area 4d of the DMD 103b, it is impossible for the light point of the IR ray 104 to be detected by the light detector 105 and, thus, the light detector 105 outputs a fourth pulse signal at a low level to the processing circuit 109. Accordingly, the processing circuit 109 will determine that the light point of the IR ray 104 is located in the fourth area 4d.

Subsequently, as shown in FIG. 4E, the processing circuit 109 further divides the fourth area 4d where the light point of the IR ray 104 is located into another third area 4d1 and another fourth area 4d2 according to the second direction (i.e., the Y direction). Then, the processing circuit 109 outputs a fifth turn-on/off signal 118 to turn on the mirrors (represented by oblique lines) of the third area 4d1 and turn off the mirrors (represented by blank portions) of the fourth area 4d2 in the DMD 103b. Then, the light detector 105 detects the light point of the IR ray 104 through the mirrors of the third area 4d1 in the DMD 103b and outputs a fifth pulse signal at a high level to the processing circuit 109. Accordingly, the processing circuit 109 will determine that the light point of the IR ray 104 is located in the third area 4d1.

According to the above description, during the spatial modulation procedure, each of the mirrors described above undergoes a series of turn-on/off operations according to a timing sequence of the first turn-on/off signal 110, the second turn-on/off signal 112, the third turn-on/off signal 114, the fourth turn-on/off signal 116 and the fifth turn-on/off signal 118 outputted by the processing circuit 109. The light detector 105 generates the first pulse signal at a high level "1", the second pulse signal at the high level "1", the third pulse signal at a low level "0", the fourth pulse signal at the low level "0" and the fifth pulse signal at the high level "1" in sequence; i.e., generates the detection signal 160 having 5 bits "11001". Finally, the processing circuit 109 matches the detection signal 160 having the 5 bits "11001" to one of the $2^2 \times 2^2$ pixels so as to determine the position of the light point of the IR ray 104 on the projection image displayed by the projection screen 13.

It shall be particularly noted that, in the example depicted in FIG. 4A to FIG. 4E, the position of the light point of the IR ray 104 on the projection image displayed by the projection screen 13 is a position where the second area 4a2 overlaps with the third area 4d1. Depending on different conditions, the position of the light point of the IR ray 104 on the projection image displayed by the projection screen 13 may also be a position where the second area 4a2 overlaps with the fourth area 4d2, a position where the first area 4a overlaps with the third area 4c or a position where the first area 4a overlaps with the fourth area 4d, and this will not be further described herein.

FIG. 5A to FIG. 5E depict another example where the DMD 103b of the projection apparatuses 10, 20 described in the first embodiment and the second embodiment performs a spatial modulation procedure within the detection period. In detail, the processing circuit 109 outputs the first turn-on/off signal 110, the second turn-on/off signal 112, the third turn-on/off signal 114, the fourth turn-on/off signal 116 and the fifth turn-on/off signal 118 in sequence; and all the mirrors of the DMD 103b perform turn-on/off operations according to a timing sequence of the aforesaid plurality of turn-on/off signals.

As shown in FIG. 5A, the DMD 103b turns on all mirrors (represented by oblique lines) of an array 5 in response to the first turn-on/off signal 110; then, the light detector 105 detects the light point of the IR ray 104 through the mirrors of the array 5 in the DMD 103b and obtains a first pulse signal at a high level.

Subsequently, as shown in FIG. 5B, in response to the second turn-on/off signal 112, the array 5 is divided into a first area 5a1 and a second area 5b1 according to the first direction (i.e., the X direction); and in response to the second turn-on/off signal 112, the DMD 103b turns on the mirrors (represented by oblique lines) of the first area 5a1 and turns off the mirrors (represented by blank portions) of the second area 5b1. Then, the light detector 105 detects the light point of the IR ray 104 through the mirrors of the first area 5a1 in the DMD 103b and obtains a second pulse signal at a high level.

Then, as shown in FIG. 5C, in response to the third turn-on/off signal 114, the array 5 is divided into another first area 5a2 and another second area 5b2 according to the first direction (i.e., the X direction); and in response to the third turn-on/off signal 114, the DMD 103b turns on the mirrors (represented by oblique lines) of the first area 5a2 and turns off the mirrors (represented by blank portions) of the second area 5b2. At this time, because the light point of the IR ray 104 is located in the second area 5b2 of the DMD 103b, it is impossible for the light point of the IR ray 104 to be detected by the light detector 105. Accordingly, a third pulse signal at a low level will be obtained by the light detector 105.

Further, as shown in FIG. 5D, in response to the fourth turn-on/off signal 116, the array 5 is divided into a third area 5c1 and a fourth area 5d1 according to the second direction (i.e., the Y direction) orthogonal to the first direction; and in response to the fourth turn-on/off signal 116, the DMD 103b turns on the mirrors (represented by oblique lines) of the third area 5c1 and turns off the mirrors (represented by blank portions) of the fourth area 5d1. At this time, because the light point of the IR ray 104 is located in the fourth area 5d1 of the DMD 103b, it is impossible for the light point of the IR ray 104 to be detected by the light detector 105. Accordingly, the light detector 105 will obtain a fourth pulse signal at a low level.

Subsequently, as shown in FIG. 5E, in response to the fifth turn-on/off signal 118, the array 5 is divided into another third area 5c2 and another fourth area 5d2 according to the second direction (i.e., the Y direction); and in response to the fifth turn-on/off signal 118, the DMD 103b turns on the mirrors (represented by oblique lines) of the third area 5c2 and turns off the mirrors (represented by blank portions) of the fourth area 5d2. At this time, the light detector 105 detects the light point of the IR ray 104 through the mirrors of the third area 5c2 in the DMD 103b and obtains a fifth pulse signal at a high level.

According to the above description, the light detector 105 obtains the first pulse signal at a high level "1", the second pulse signal at the high level "1", the third pulse signal at a low level "0", the fourth pulse signal at the low level "0" and the fifth pulse signal at the high level "1" in sequence, i.e., obtains the detection signal 160 having 5 bits "11001". Subsequently, the light detector 105 outputs the detection signal 160 having the 5 bits "11001" to the processing circuit 109. Finally, the processing circuit 109 matches the detection signal 160 having the 5 bits "11001" to one of the $2^2 \times 2^2$ pixels so as to determine the position of the light point of the IR ray 104 on the projection image displayed by the projection screen 13.

It shall be particularly noted that, in the example depicted in FIG. 5A to FIG. 5E, the position of the light point of the IR ray 104 on the projection image displayed by the projection screen 13 is a position where the second area 5b2 overlaps with the third area 5c2. Depending on different conditions, the position of the light point of the IR ray 104 on the projection image displayed by the projection screen 13 may also be a position where the second area 5b2 overlaps with the fourth area 5d2, a position where the first area 5a2 overlaps with the third area 5c2 or a position where the first area 5a2 overlaps with the fourth area 5d2, and this will not be further described herein.

Figure 6:
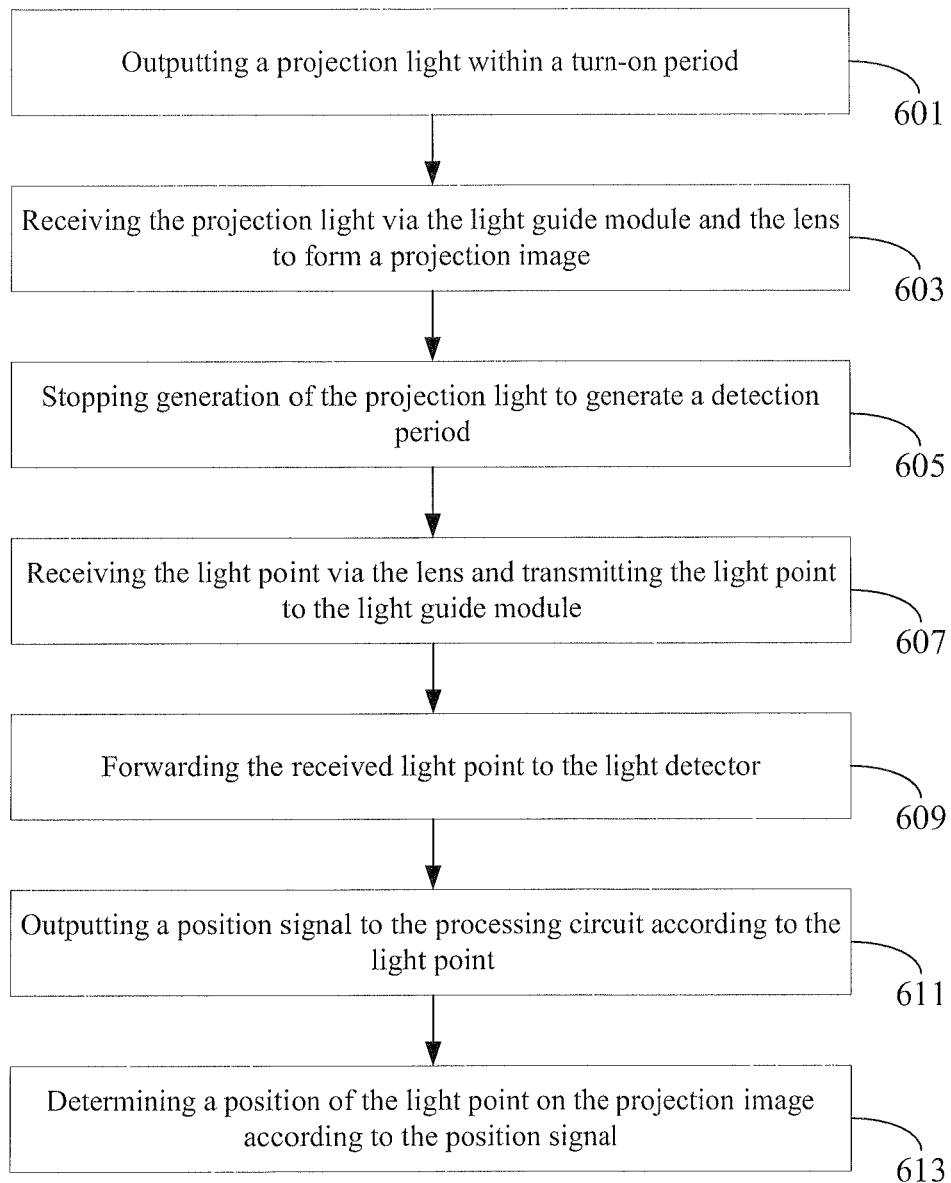
FIG. 6 is a flowchart illustrating a method of a third embodiment of the present invention.

A third embodiment of the present invention is as shown in FIG. 6, which is a method for determining a position of a light point on a projection image. The method of the present invention is adapted for a projection apparatus, for example, either of the projection apparatuses 10, 20 described in the first embodiment and the second embodiment described above. The projection apparatus comprises a lens, a light guide module, a light detector, a processing circuit and a light source module adapted to generate a projection light.

The method for determining a position of a light point on a projection image of the third embodiment comprises the following steps. Firstly, step 601 is executed to output a projection light within a turn-on period. Then, step 603 is executed to receive the projection light via the light guide module and the lens to form a projection image. Subsequently, step 605 is executed to stop generation of the projection light to generate a detection period. Further, step 607 is executed to receive a light point via the lens and transmit the light point to the light guide module within the detection period. Step 609 is executed to forward the received light point to the light detector. Then, step 611 is executed to output a detection signal to the processing circuit according to the light point. Finally, step 613 is executed to determine the position of the light point on the projection image according to the detection signal.

Apart from the aforesaid steps, operations and functions described in the first embodiment and the second embodiment can also be executed by the method for determining a position of a light point on a projection image of the present invention. How these operations and functions are executed by the method for determining a position of a light point on a projection image of the present invention based on the first embodiment and the second embodiment described above will be readily appreciated by those of ordinary skill in the art and, thus, will not be further described herein.

Figure 7:
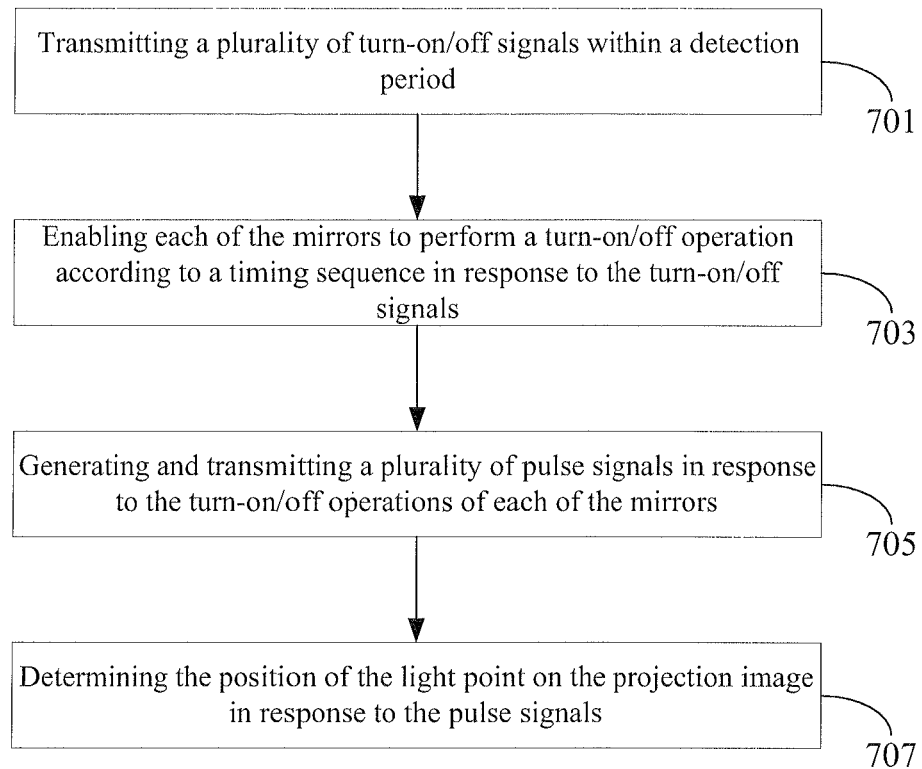
FIG. 7 is a flowchart illustrating a location method of a fourth embodiment of the present invention.

FIG. 7 shows a fourth embodiment of the present invention, which is a location method for determining a position of a light point on a projection image within a detection period. The location method of the present invention is adapted for a projection apparatus, for example, either of the projection apparatuses 10, 20 described in the first embodiment and the second embodiment described above. The projection apparatus comprises a light guide module, a light detector and a light source module adapted to generate a projection light. The light guide module is adapted to forward a light point and has a plurality of mirrors that form an array of $2^n \times 2^m$ pixels, and the projection image corresponds to the array.

The location method for determining a position of a light point on a projection image within a detection period of the fourth embodiment comprises the following steps. Firstly, step 701 is executed to transmit a plurality of turn-on/off signals within the detection period. Afterwards, step 703 is executed to enable each of the mirrors to perform a turn-on/off operation according to a timing sequence in response to the turn-on/off signals. Then, step 705 is executed to enable the light detector to generate and transmit a plurality of pulse signals in response to the turn-on/off operations of the mirrors. Finally, step 707 is executed to determine the position of the light point on the projection image in response to the aforesaid pulse signals.

In the following paragraphs, different examples of how the location method of the fourth embodiment determines the position of the light point of an IR ray on the projection image through the turn-on/off operations performed according to a timing sequence by the mirrors will be described with reference to FIG. 8A and FIG. 8B.

Figure 8A:
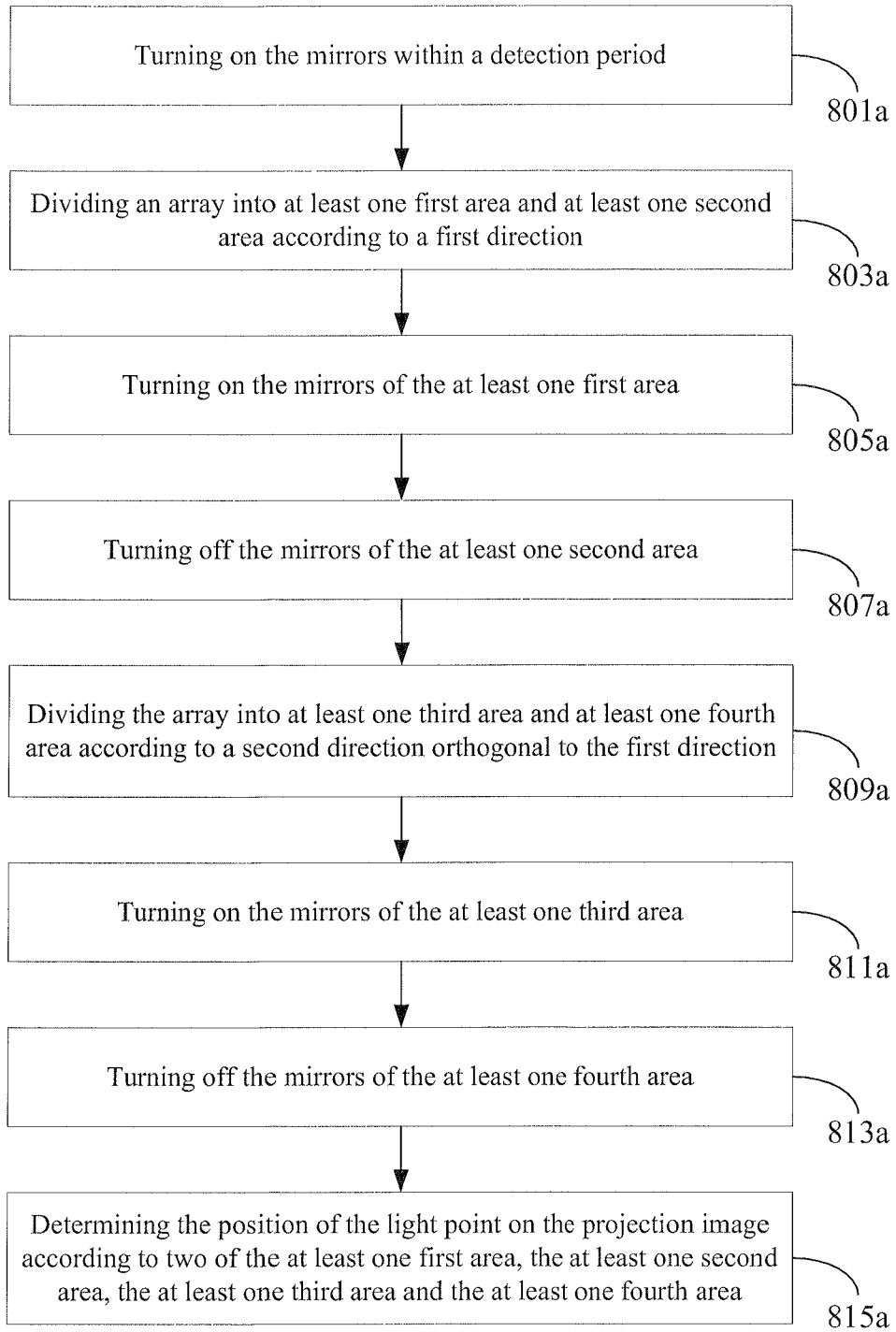
FIGS. 8A and 8B are a flowchart of an example of the fourth embodiment.

FIG. 8A is a flowchart of one of examples where the location method of the fourth embodiment determines the position of the light point of the IR ray on the projection image through the turn-on/off operations performed according to a timing sequence by the mirrors. Firstly, step 801a is executed to turn on the mirrors within a detection period. Then, step 803a is executed to divide an array into at least one first area and at least one second area according to a first direction. Subsequently, step 805a is executed to turn on the mirrors of the at least one first area. Further, step 807a is executed to turn off the mirrors of the at least one second area.

Step 809a is executed to divide the array into at least one third area and at least one fourth area according to a second direction orthogonal to the first direction. Then, step 811a is executed to turn on the mirrors of the at least one third area. Subsequently, step 813a is executed to turn off the mirrors of the at least one fourth area. Finally, step 815a is executed to determine the position of the light point on the projection image according to two of the at least one first area, the at least one second area, the at least one third area and the at least one fourth area.

Figure 8B:
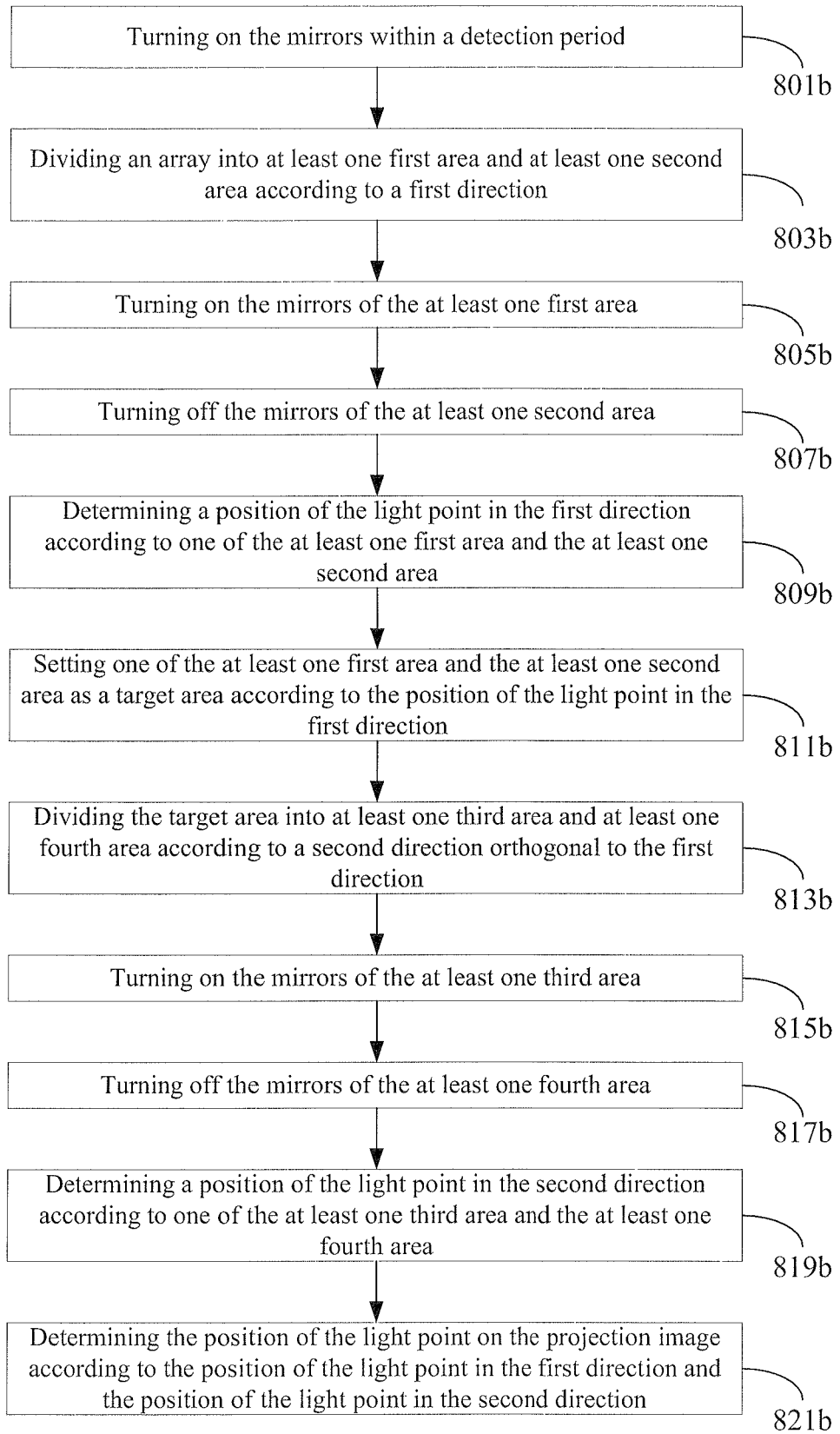

FIG. 8B is a flowchart of another example where the location method of the fourth embodiment determines the position of the light point of the IR ray on the projection image through the turn-on/off operations performed according to a timing sequence by the minors. Firstly, step 801b is executed to turn on the minors within a detection period. Then, step 803b is executed to divide an array into at least one first area and at least one second area according to a first direction. Subsequently, step 805b is executed to turn on the mirrors of the at least one first area. Further, step 807b is executed to turn off the minors of the at least one second area. Step 809b is executed to determine a position of the light point in the first direction according to one of the at least one first area and the at least one second area described above.

Step 811b is executed to set one of the at least one first area and the at least one second area described above as a target area according to the position of the light point in the first direction. Thereafter, step 813b is executed to divide the target area into at least one third area and at least one fourth area according to a second direction orthogonal to the first direction. Then, step 815b is executed to turn on the mirrors of the at least one third area. Subsequently, step 817b is executed to turn off the minors of the at least one fourth area. Further, step 819b is executed to determine a position of the light point in the second direction according to one of the at least one third area and the at least one fourth area described above. Finally, step 821b is executed to determine the position of the light point on the projection image according to the position of the light point in the first direction and the position of the light point in the second direction.

Apart from the aforesaid steps, operations and functions described in the first embodiment and the second embodiment can also be executed by the location method for determining a position of a light point on a projection image within a detection period of the present invention. How these operations and functions are executed by the location method of the present invention based on the first embodiment and the second embodiment described above will be readily appreciated by those of ordinary skill in the art and, thus, will not be further described herein.

According to the above description, the projection apparatus and the location method of the present invention form a projection image and determine a position of a light point on the projection image through turn-on/off operations of the DMD. Thus, the position of the light point on the projection image can be determined by using elements already comprised in the projection apparatus per se directly. Accordingly, compared to the conventional projection apparatus with interaction functionality, the projection apparatus of the present invention not only has the advantage of a miniaturized design, but can also save cost of the CCD so as to further reduce the production cost.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus being adapted to determine a position of a light point on a projection image, the projection apparatus comprising:
   a lens;
   a light detector;
   a light guide module, being adapted to receive the light point via the lens and guide the light point to the light detector; and
   a processing circuit electrically connected to the light detector,
      wherein the light guide module performs a spatial modulation procedure within a detection period, the light detector receives the light point from the light guide module and outputs a detection signal to the processing circuit according to the light point within the detection period so that the processing circuit determines the position of the light point on the projection image according to the detection signal detected by the light detector within the spatial modulation procedure.

2. The projection apparatus as claimed in claim 1, further comprising:
   a light source module, being adapted to output a projection light,
      wherein the light guide module transforms the projection light into the projection image, and the lens projects the projection image after receiving the projection image from the light guide module.

3. The projection apparatus as claimed in claim 2, wherein the light source module further comprises:
   a light bulb, being adapted to generate the projection light; and
   a color wheel,
      wherein when the color wheel blocks the projection light within the detection period, the light detector receives the light point from the light guide module and outputs the detection signal to the processing circuit according to the light point so that the processing circuit determines the position of the light point on the projection image according to the detection signal.

4. The projection apparatus as claimed in claim 3, wherein the color wheel further comprises a red section, a blue section, a green section and a black section, the projection light is adapted to be blocked by the black section and the detection period is generated by the black section.

5. The projection apparatus as claimed in claim 2, wherein the light source module further comprises:
   at least one light emitting diode (LED), being adapted to generate the projection light; and
   a control unit, being adapted to control turn-on/off of the at least one LED,
      wherein, when the control unit turns off the at least one LED, the light detector receives the light point from the light guide module and outputs the detection signal to the processing circuit according to the light point so that the processing circuit determines the position of the light point on the projection image according to the detection signal.

6. The projection apparatus as claimed in claim 1, wherein the light guide module comprises a TIR-prism, a digital micromirror device (DMD) and a beam splitter, the DMD performs the spatial modulation procedure within the detection period.

7. The projection apparatus as claimed in claim 1, wherein the detection signal consists of a plurality of pulse signals.

8. A location method for determining a position of a light point on a projection image, being adapted for a projection apparatus, wherein the projection apparatus comprises a lens, a light guide module, a light detector, a processing circuit and a light source module, and the light source module is adapted to generate a projection light, the location method comprising the following steps of:
   generating a detection period;
   stopping the projection light being projected within the detection period;
   receiving the light point via the lens and transmitting the light point to the light guide module;
   after receiving the light point, forwarding the light point to the light detector;
   outputting a detection signal to the processing circuit according to the light point; and
   determining the position of the light point on the projection image according to the detection signal.

9. The location method as claimed in claim 8, wherein the step of stopping the projection light being projected within the detection period further comprises performing a spatial modulation procedure so that the position of the light point on the projection image can be determined according to the detection signal detected within the spatial modulation procedure.

10. The location method as claimed in claim 8, further comprising the following steps of:
    generating a turn-on period;
    outputting the projection light within the turn-on period; and
    receiving the projection light via the light guide module and the lens to form the projection image.

11. The location method as claimed in claim 8, wherein the step of generating the detection period further comprises the following step of:
    providing a color wheel comprising a red section, a blue section, a green section and a black section,
       wherein the detection period is generated by using the black section to block the projection light.

12. The location method as claimed in claim 8, wherein the light source module has at least one LED, and the step of generating the detection period further comprises the following step of:
    turning off the at least one LED,
       wherein the detection period is generated by turning off the at least one LED.

13. The location method as claimed in claim 8, wherein the light guide module comprises a DMD and a beam splitter.

14. A location method for determining a position of a light point on a projection image within a detection period, being adapted for a projection apparatus, wherein the projection apparatus comprises a light guide module and a light source module, the light source module is adapted to generate a projection light, and the light guide module is adapted to forward the light point and has a plurality of minors that form an array, the location method comprising the following steps of:

stopping the projection light being projected within the detection period;
  turning on the mirrors;
  dividing the array into at least one first area and at least one second area according to a first direction;
  turning on the mirrors of the at least one first area;
  turning off the minors of the at least one second area;
  dividing the array into at least one third area and at least one fourth area according to a second direction, wherein the first direction is orthogonal to the second direction;
  turning on the mirrors of the at least one third area;
  turning off the minors of the at least one fourth area; and
  determining the position of the light point on the projection image according to two of the at least one first area, the at least one second area, the at least one third area and the at least one fourth area.

15. The location method as claimed in claim 14, wherein the position of the light point on the projection image is substantially a position where the at least one first area overlaps with one of the at least one third area and the at least one fourth area.

16. The location method as claimed in claim 14, wherein the position of the light point on the projection image is substantially a position where the at least one second area overlaps with one of the at least one third area and the at least one fourth area.

17. The location method as claimed in claim 14, wherein the at least one first area substantially partially overlaps with the at least one third area and the at least one fourth area respectively, and the at least one second area substantially partially overlaps with the at least one third area and the at least one fourth area respectively.

18. A location method for determining a position of a light point on a projection image within a detection period, being adapted for a projection apparatus, wherein the projection apparatus comprises a light guide module and a light source module, the light source module is adapted to generate a projection light, and the light guide module is adapted to forward the light point and has a plurality of minors that form an array, the location method comprising the following steps of:

stopping the projection light being projected within the detection period;
  turning on the mirrors;
  dividing the array into at least one first area and at least one second area according to a first direction;
  turning on the mirrors of the at least one first area;
  turning off the minors of the at least one second area;
  determining a position of the light point in the first direction according to one of the at least one first area and the at least one second area;
  dividing one of the at least one first area and the at least one second area into at least one third area and at least one fourth area according to the position of the light point in the first direction and according to a second direction, wherein the first direction is orthogonal to the second direction;
  turning on the mirrors of the at least one third area;
  turning off the minors of the at least one fourth area;
  determining a position of the light point in the second direction according to one of the at least one third area and the at least one fourth area; and
  determining the position of the light point on the projection image according to the position of the light point in the first direction and the position of the light point in the second direction.

19. The location method as claimed in claim 18, wherein the position of the light point on the projection image is substantially a position where the at least one first area overlaps with one of the at least one third area and the at least one fourth area.

20. The location method as claimed in claim 18, wherein the position of the light point on the projection image is substantially a position where the at least one second area overlaps with one of the at least one third area and the at least one fourth area.

21. A location method for determining a position of a light point on a projection image within a detection period, being adapted for a projection apparatus, wherein the projection apparatus comprises a light guide module, a light source module and a light detector, the light source module is adapted to generate a projection light, the light guide module is adapted to forward the light point and has a plurality of mirrors that form an array having $2^n \times 2^m$ pixels, and the projection image corresponds to the array, the location method comprising the following steps of:

stopping the projection light being projected within the detection period;
  transmitting a plurality of turn-on/off signals within the detection period;
  performing a turn-on/off operation by each of the mirrors according to a timing sequence in response to the turn-on/off signals;
  enabling the light detector to generate and transmit a plurality of pulse signals according to the turn-on/off operation of each of the minors; and
  determining the position of the light point on the projection image according to the pulse signals.

22. The location method as claimed in claim 21, wherein the pulse signals form a detection signal that is comprised of $n+m+1$ bits and corresponds to one of the $2^n \times 2^m$ pixels.

23. The location method as claimed in claim 21, wherein the detection signal is one of a plurality of binary values, and the binary values correspond to the $2^n \times 2^m$ pixels respectively.

* * * * *